United States Patent [19]

Enomoto et al.

[11] Patent Number: 4,793,691

[45] Date of Patent: Dec. 27, 1988

[54] LIQUID CRYSTAL COLOR DISPLAY DEVICE

[75] Inventors: Takamichi Enomoto, Tokyo; Wasaburo Ohta; Kiyohiro Uehara, both of Kanagawa; Sumio Kamoi, Chiba; Fuyuhiko Matsumoto, Saitama, all of Japan

[73] Assignee: Ricoh Company, Ltd., Tokyo, Japan

[21] Appl. No.: 812,860

[22] Filed: Dec. 23, 1985

[30] Foreign Application Priority Data

| Dec. 25, 1984 | [JP] | Japan | 59-272011 |
| Jan. 8, 1985 | [JP] | Japan | 60-000345 |
| Mar. 22, 1985 | [JP] | Japan | 60-056174 |
| May 7, 1985 | [JP] | Japan | 60-095544 |
| May 7, 1985 | [JP] | Japan | 60-095545 |
| May 10, 1985 | [JP] | Japan | 60-098046 |
| May 10, 1985 | [JP] | Japan | 60-098047 |
| Oct. 25, 1985 | [JP] | Japan | 60-238713 |

[51] Int. Cl.$^4$ .................................................. G02F 1/13
[52] U.S. Cl. ........................... 350/339 F; 350/339 R; 350/345
[58] Field of Search ................. 350/339 F, 337, 345, 350/392, 339 R, 311; 358/61

[56] References Cited

U.S. PATENT DOCUMENTS

| 3,840,695 | 10/1974 | Fischer | 350/392 |
| 4,003,081 | 1/1987 | Hilsum et al. | 350/61 |
| 4,289,383 | 9/1981 | Schwarzschild | 350/345 |
| 4,470,666 | 9/1984 | Eick | 350/345 |
| 4,526,818 | 7/1985 | Hoshikawa et al. | 350/337 |
| 4,610,507 | 9/1986 | Kamamori et al. | 350/339 F |
| 4,611,889 | 9/1986 | Buzak | 350/345 |
| 4,678,285 | 7/1987 | Ohta et al. | 350/339 F |

FOREIGN PATENT DOCUMENTS 2137397 10/1984 United Kingdom ............ 350/339 F

Primary Examiner—Stanley D. Miller
Assistant Examiner—Huy K. Mai
Attorney, Agent, or Firm—Oblon, Fisher, Spivak, McClelland & Maier

[57] ABSTRACT

A liquid crystal color display device having a liquid crystal unit, a light source, and a color filter. The liquid crystal unit has a liquid crystal cell having a sealed liquid crystal material and a transparent pixel electrode composed of pixel electrode elements. The liquid crystal unit controls transmission and shutoff of light dependent on image information. The color filter is positioned for passage therethrough of light emitted from the light source. The color filter comprises pixel filters aligned with the pixel electrode elements in the liquid crystal cell. The spectral light transmission ranges of the respective pixel filters and/or the spectral light emission ranges of the light source are determined for improved improving color reproduceability.

17 Claims, 5 Drawing Sheets (A)

(B)

LIQUID CRYSTAL COLOR DISPLAY DEVICE

BACKGROUND OF THE INVENTION

1. Field of the Invention

The present invention relates to a liquid crystal color display device and more particularly to a crystal color display device employing a liquid crystal element or unit as a light switching element.

2. Discussion of the Background

Heretofore, color display devices have typically employed CRTs (cathode-ray tubes) and have widely been used in television display units, OA (office automation) components, and other display units The CRT is a type of vacuum tube having a large conical shape. A display unit composed of a CRT must therefore be powered by a high-voltage power supply, requires a complex driver circuit, and is large in overall size, with the result that the display unit could not be thinned down beyond a certain limit.

Recent years have seen the development of panel-shaped liquid crystal display devices, which have resulted in pocketable liquid crystal color television receivers. As described in a Japanese periodical "Nikkei Electronics", 1984, 9-10, pages 211 to 240, such a pocketable liquid crystal color television receiver comprises a liquid crystal panel composed of a glass plate having red, green, and blue color filters assigned to each pixel, another transparent plate with an array of thin-film transistors disposed thereon, a TN (twisted nematic) liquid crystal material sealed between the plates, and a pair of polarizers sandwiching the plates and an illuminating light source positioned behind the liquid crystal panel Transparent pixel electrodes are arranged in alignment respectively with the pixel color filter elements. When the thin-film transistors are driven, signal voltages are applied to the pixel electrodes to control light transmission and shutoff.

Although the liquid crystal color display device described above can be constructed in a low profile, it is still disadvantageous in that color generation and reproducibility are insufficient due to the use of the optical filter, and in that displayed images have a low contrast and hence cannot be seen well.

With the prior liquid crystal color display device employing a glass plate or silicon subtrate, the pixel color filter elements must to be fabricated on the inner surface of the plate or substrate since if the color filter pattern were formed on the outer surface of the plate or substrate in corresponding relation to the transparent pixel electrodes on the inner surface of the plate or subtrate, color shifts would be generated due to the thickness of the plate or substrate. According to one method to achieve this an arrangement, the color filter elements are first formed on the inner surface of the plate or subtrate, and then an ITO film is formed on the color filters with the transparent pixel electrodes on the ITO film. According to another method, the transparent pixel electrodes are formed on the plate or substrate, and the color filter elements are formed on the transparent pixel electrodes. These methods have not been completely advantageous however. The color filter elements are formed by the dyeing process or the electro-depositing process. In order to provide better color reproducibility of the color display, it is preferable to increase the thickness of the filter layer up to a range of from a few to ten micrometers. In case the color filter is formed directly on the inner surface of the plate or substrate, the increased thickness of the color filter fails to make the filter layer surface smooth when a transparent electrically conductive film is to be formed on the color filter. Where the color filter elements are to be formed on the transparent pixel electrodes, the threshold voltage to be applied when driving the liquid crystal is increased since the color filter itself is an insulating layer. As a consequence, the color filter is required to be of a reduced thickness which cannot however accomplish sufficient color reproduceability.

SUMMARY OF THE INVENTION

Accordingly, it is a first object of the present invention to provide a liquid crystal color display device having high color reproduceability.

A second object of the present invention is to provide a liquid crystal color display device which suffers from small color shifts and has a threshold voltage that will not be increased when driving the liquid crystal.

A third object of the present invention is to provide a liquid crystal color display device which has high color reproduceability, suffers from small color shifts, and has a threshold voltage that will not be increased when driving the liquid crystal.

A liquid crystal color display device according to the present invention has a liquid crystal unit for controlling light transmission and shutoff dependent on image information, a light source, and a color filter. The liquid crystal unit has a liquid crystal cell having a sealed liquid crystal material and transparent pixel electrodes. The color filter has a pixel arrangement corresponding t the pixel arrangement of transparent pixel electrodes in the liquid crystal cell. The color filter may be united with part of the light source. The color filter is composed of pixel-like elements which are referred to as pixel filters.

The first object of the present invention is achieved by employing a fluorescent body as the light-emitting body of the light source and arranging the pixel filters of different colors such that the wavelength regions at the half-amplitude level of their light transmission spectrums will not overlap each other.

The first object can also be accomplished by arranging the fluorescent body such that the wavelength regions at the half-amplitude levels of the spectrums of lights emitted by the fluorescent body will be contained in the wavelength regions at the half-amplitude levels of the light transmission spectrums of the pixel filters having the corresponding colors.

The second object can be achieved by constructing at least one of plates in the liquid crystal cell of a thin plastic film, the color filter being formed on the side of the plastic film which is not in of contact with the liquid crystal material.

The third object can be accomplished by constructing at least one of plates in the liquid crystal cell of a thin plastic film, the color filter being formed on the side of the plastic film which is not in contact with the liquid crystal material, by employing a fluorescent body as the light-emitting body of the light source, and by either arranging the pixel filters of different colors such that the wavelength regions at the half-amplitude levels of their light transmission spectrums will not overlap each other, or arranging the fluorescent body such that the wavelength regions at the half-amplitude levels of the spectrums of lights emitted by the fluorescent body will be contained in the wavelength regions in the half-amplitude widths of the light transmission spectrum of the pixel filters having the corresponding colors. The fluorescent body of the liquid source is disposed as a layer on an appropriate support sheet such as a plastic film, the layer of the fluorescent body being referred to as a fluorescent layer.

The above and other objects, features and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Figure 1:
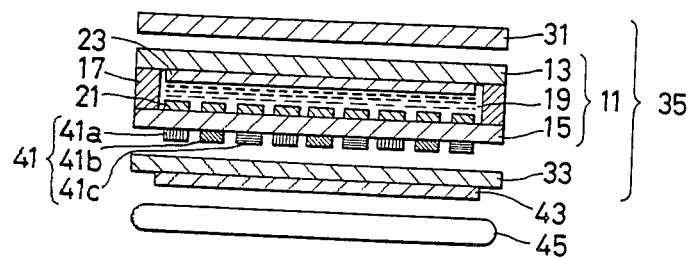
FIG. 1 is an exploded cross-sectional view of a liquid crystal color display device according to an embodiment of the present invention.

Various other objects, features and attendant advantages of the present invention will be more fully appreciated as the same becomes better understood from the following detailed description when considered in connection with the accompanying drawings in which like reference characters designate like or corresponding parts throughout the several views and wherein:

FIG. 1 shows a liquid crystal color display device according to a first embodiment of the present invention, the liquid crystal color display device having a liquid crystal cell generally designated by the reference numeral 11. The liquid crystal cell 11 comprises an upper plate 13, a lower plate 15 disposed parallel to and opposite the upper plate 13 and spaced therefrom, and a liquid crystal material 19 sealed between the upper and lower plates 13, 15 by a sealing member 17. The lower and upper plates 15, 13 support a transparent pixel electrode 21 and a transparent common electrode 23, respectively. The pixel electrode 21 comprises a matrix of electrode elements. The liquid crystal cell 11 is sandwiched between a first polarizer 31 to be observed by an observer and a second polarizer 33 having an axis of absorption parallel to that of the first polarizer 31. The liquid crystal cell 11 and the first and second polarizers 31, 33 jointly constitute a 90°-TN liquid crystal unit or element 35 serving as a light switching element.

The liquid crystal color display device also includes a color filter 41 disposed below the liquid crystal cell 11 and having a mosaic-patterned pixel filters 41a, 41b, 41c capable of passing light in red (R), green (G), and blue (B). The pixel filters 41a, 41b, 41c are positioned in alignment with the respective electrode elements of the transparent pixel electrode 21.

A fluorescent layer 43 is disposed on the lower surface of the second polarizer 33 and contains fluorescent materials capable of emitting fluorescent light in red (R), green (G), and blue (B). The amounts of the fluorescent materials contained are appropriately selected in view of the tones of colors to be achieved. Below the fluorescent layer 43, there is positioned an ultraviolet lamp 45 as an energy source for stimulating the fluorescent materials to emit light.

Figure 2:
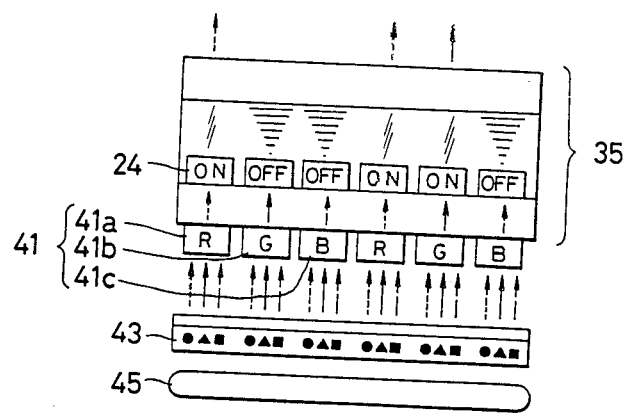
FIG. 2 is a schematic diagram illustrative of operation of the liquid crystal color display device shown in FIG. 1.
Figure 3:
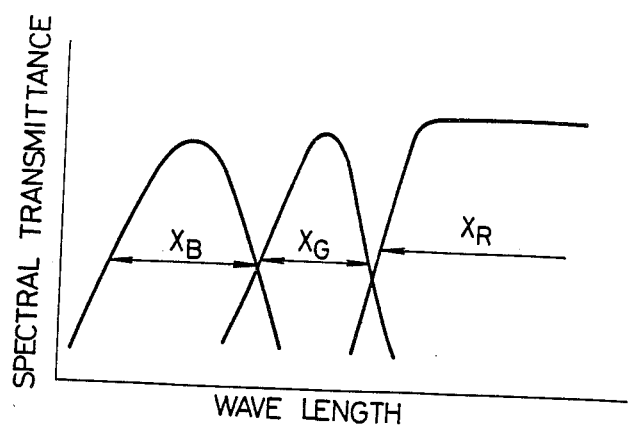
FIG. 3 is a graph showing the features of the liquid crystal color display device of FIG. 1.

As shown in FIG. 2, when the ultraviolet lamp 45 is energized, the fluorescent materials (indicated by the solid circles for R, squares for G, and triangles for B) of the fluorescent layer 43 emit lights in the colors R, G, B as indicated by the arrows ----→, →, — —→. The emitted lights fall on the pixel filters 41a, 41b, 41c of the color filter 41. The red pixel filters 41a (R) pass the red light (R ---→), the green pixel filters 41b (G) pass the green light (G→), and the blue pixel filters 41c (B) pass the blue light (B — —→). These transmitted lights then impinge upon the liquid crystal unit 35. Since the elements of the transparent pixel electrode 21 are aligned with the pixel filters 41a, 41b, 41c, respectively, the lights passing through the liquid crystal unit 35 can be controlled by applying voltages represented by color image signals to the elements of the transparent pixel electrode 21 through thin-film transistors or MIM elements (not shown). The liquid crystal unit 35 allows only those lights to be transmitted therethrough from the pixel filters corresponding to the pixel electrode elements 21 to which the voltage is applied. The lights transmitted through the liquid crystal unit 35 can be observed as a fully-colored image. FIG. 2 illustrates the condition in which the lights in R and G are transmitted in the proportion of 2:1.

The fluorescent layer 43 can be manufactured by dispersing fluorescent particles in a binder. Inasmuch as each of the fluorescent particles emits light, the fluorescent layer 43 can serve as a uniform planar light source capable of bright and uniform color display in combination with its high light-emitting energy characteristics. The fluorescent layer 43 therefore can achieve a large-size display screen.

As the fluorescent lights in R, G, B pass through the respective color filters of R, G, B, the lights are changed into clear R, G, B lights which provide good color reproducibility. It is possible to arrange the fluorescent body such that the colors of the colored lights emitted therefrom will not overlap each other. The color filter should also be arranged such that the filter colors will not overlap each other; or the colors of the lights transmitted from the color filter may deviate from the three primaries, resulting in a color mixture.

To avoid this drawback, the wavelength regions $X_B$, $X_G$, $X_R$ at the half-amplitude levels of the light transmission spectrums of the R, G, B pixel filters are selected not to overlap each other. The light transmission characteristics of the pixel color filters allow the lights emitted from the fluorescent layer 43 to be added to each other for color display of good color reproduceability.

The pixel filters can be formed to avoid overlap of the wavelength regions at the half-amplitude levels by using color materials having sharp absorption wavelength distributions or by controlling the densities of color materials in the pixel filters. More specifically, if there is no wavelength other than the required colors, then the densities of the color materials are reduced, and if there are other wavelengths than the required colors, then the densities of the color materials capable of absorbing such other wavelengths are increased, so that only absorbed lights of dominant wavelengths will be transmitted while lowering transitivity in the other wavelength region.

The pixel filters may be formed of color materials such as dyes or pigments by the dyeing process, the printing process, or the electrodepositing process. The dyes that can be used may be a quinacridone pigment o a phthalocyanine pigment, for example.

The fluorescent layer may be formed by uniformly dispersing powdery fluorescent materials in a resin binder and coating the mixture on the second polarizer 33. The fluorescent materials which emit red light include MgO MgF$_2$ GeO$_2$: Mn compound and Y$_2$O$_3$. The fluorescent materials which emit green light include Zn$_2$SiO$_4$: Mn, LaPO$_4$: Ce, an Tb. The fluorescent materials which emit blue light include (SrCaBa)$_5$(PO$_4$)$_3$Cl: Eu and Sr$_5$(PO$_4$)$_3$Cl: Eu. The binder may be an acrylic resin or a fibrous resin such as nitrocellulose or triacetate.

As an example, the pixel filters were made using a quinacridone pigment, phthalocyanine blue, and phthalocyanine green as the dyes, such that the absorbed wavelength regions at the half-amplitude levels will not overlap each other, and Y$_2$O$_2$S: Eu (red), ZnSiO$_3$ (Mn) (green), and ZnS: ZnO: Ag (blue) were used as the fluorescent materials. The pixel filters and the fluorescent pixels were formed as dots so that the same pixel colors will be aligned. When ultraviolet radiation was applied to the fluorescent layer, an image in clear colors of blue, green, and red was reproduced.

Figure 4:
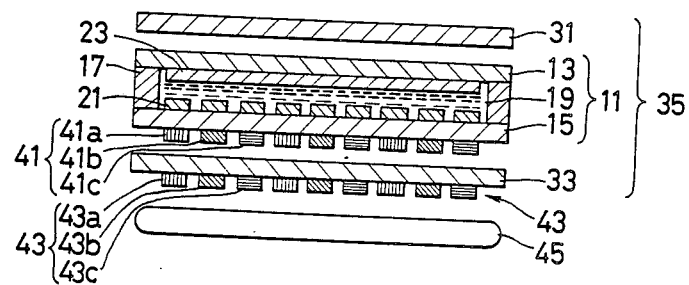
FIG. 4 is an exploded cross-sectional view of a liquid crystal color display device according to another embodiment of the present invention.
Figure 5:
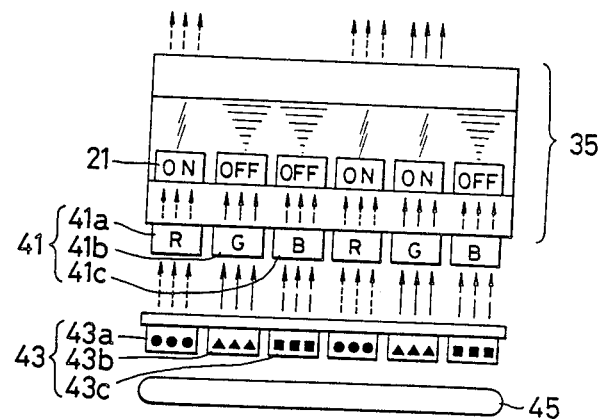
FIG. 5 is a schematic diagram illustrative of operation of the liquid crystal color display device shown in FIG. 4.

FIGS. 4 and 5 illustrate another embodiment in which a fluorescent layer comprises a matrix pattern of pixel fluorescent elements, and these pixel fluorescent elements, the pixel filters, and the pixel electrode elements are aligned.

The fluorescent layer 43 has a fluorescent pixel pattern comprising pixel fluorescent elements 43a, 43b, 43c respectively including a red fluorescent material R (indicated by solid circles), a green fluorescent material G (indicated by solid squares), and a blue fluorescent material B (indicated by solid triangles). The fluorescent layer 43 can contain more fluorescent materials R, G, B than those in the fluorescent layer 43 shown in FIG. 1. Therefore, the level of energy of the R, G, B lights that have passed through the fluorescent layer 43 for display is higher. Thus, the displayed image is sharper for better observation.

The pixel filters 41a, 41b, 41c can be formed on the upper plate 13 or the transparent electrode, or on another suitable support. However, it is preferable that the pixel filters be formed on the plate of the liquid crystal cell over its outer surface opposite to the surface on which the transparent electrode is disposed. With the pixel electrode elements and the pixel filters formed on the opposite surfaces of one plate, they can be accurately positioned without involving a large positional deviation irrespective of the assembling accuracy. Since the color filter 41 is disposed on the plate surface which is out of contact with the liquid crystal material, the film thickness of the color filter can be increased to a sufficient extent. This arrangement allows images of good color reproduceability to be displayed, and provides a wide choice of color materials and processes of forming the color filter. Although the plates of the liquid crystal cell may be made of glass, they should preferably be plastic films. Where the plates are plastic films, their thickness can be reduced, with the consequence that when the color filter and the transparent electrode are disposed on the opposite surfaces of the plate, light which passes through the color filter is prevented from being scattered, and colors are prevented from being mixed in the event of an increased angle of view. The plastic film may be in the form of a film of uniaxially stretched polyester, biaxially stretched polyester, polyether sulfone, polysulfone, polycarbonate, or triacetate, or may comprise a protected film of one of these materials to which an inorganic or organic material is overcoated. The plastic film is flexible and can be thinned down. The thickness of the plastic film plate is 120 micrometers or less, and preferably in the range of from 80 to 100 micrometers.

The aforesaid embodiments shown in FIGS. 1 through 3 and FIGS. 4 and 5 are designed to achieve the first object described above.

In the foregoing embodiments, the wavelength regions at the half-amplitude levels of the light transmission spectrums of the pixel filters having different colors do not overlap each other. However, the first object can also be accomplished by arranging the fluorescent layer such that the wavelength regions at the half-amplitude levels of the light emission spectrums (indicated by the solid lines in FIG. 6) of the fluorescent materials used are contained in the wavelength regions at the half-amplitude levels of the light transmission spectrums (indicated by the dotted lines in FIG. 6) of the pixel filters of the corresponding colors. For example, the wavelength region at the half-amplitude level of the light emission spectrum (the solid line B in FIG. 6) of the fluorescent material capable of emitting blue light ranges from 430 to 470 nm, whereas the wavelength region at the half-amplitude level of the light transmission spectrum (the dotted line B in FIG. 6) of the pixel filters capable of transmitting blue light ranges from 410 to 490 nm. By permitting the colored lights from the fluorescent materials to pass through the colored filters, the colors are added into R, G, B lights which are closer to primaries. This, together with the fact that the lights emitted from the fluorescent materials have a high energy level, makes it possible to display bright color images of good color reproduceability. The color liquid crystal cell employed to achieve the characteristics of FIG. 6 may be the same as those shown in FIGS. 1 and 4. Thus, another embodiment which can achieve the first object can be obtained by determining the spectral characteristics of the fluorescent materials and the color filter of FIGS. 1 and 4 as indicated by those of FIG. 6.

The color material or dee used in the red pixel filters may be Lanyl red GG. The dye used in the blue pixel filters may be Suminol milling yellow MR (manufactured by Sumitomo Chemical) or Cibacron turquoise blue TG-E. The dye used in the blue pixel filters may be Cyanine 6B. The pigments may be a red quinacridone pigment, phthalocyanine blue, and phthalocyanine green. While the pixel filters may be dichroic mirrors fabricated by the vacuum evaporation process and used as colored filters, it is better in production to fabricate the pixel filters of dyes or pigments by the printing process.

The fluorescent materials are used principally in the form of powder. Examples of the fluorescent material for emitting red light include $Y_2O_2S$ Eu: (yttrium oxysulfide: europium) and $Y_2O_2$: Eu (yttrium oxide: europium). Examples of the fluorescent material for emitting green light include $ZnSiO_3$ (Mn) (manganese-doped zinc silicate), ZnS: CuAl (zinc sulfide: doped with copper and aluminum), (Zn Cd) S: Cu (zinc sulfide, cadmium: doped with copper), and (Zn Cd) S: Ag (zinc sulfide, cadmium: doped with silver). Examples of the fluorescent material for emitting blue light include ZnS: Ag (zinc sulfide: doped with silver) and (ZnS, ZnO): Ag (zinc sulfide, zinc oxide: doped with silver).

The fluorescent layer can be formed by uniformly dispersing such fluorescent materials in a suitable binder such as of acrylic resin or fibrous resin such as nitrocellulose or triacetate, and coating the mixture on the first polarizer. The fluorescent layer can be patterned as red, green, and blue pixel elements by the photolithographic process or the printing process.

While the quinacridone pigment and the phthalocyanine pigment have been described above as color materials of the pixel filters of the color filter, an anthraquinone pigment can also be employed.

The quinacridone pigment and the anthraquinone pigment are suitable for use as red color materials, and the phthalocyanine pigment is suitable for use as blue and green color materials.

The quinacridone pigment can be expressed by the general formula:

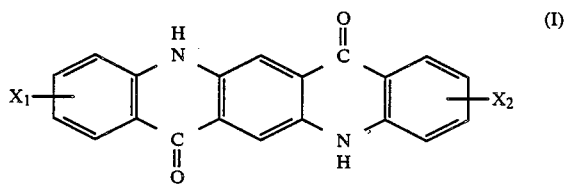

where $X_1, X_2$ indicate hydrogen or substituents. Particularly suitable are those expressed by the above general formula (I) in which $X_1, X_2$ indicate hydrogen, chlorine, bromine, a methyl group, or sulfur.

The light transmission spectrum of the quinacridone pigment expressed by the formula (I) has a wavelength region which does not extend at the half-amplitude level up to the wavelength region of green light. Therefore, a color mixture with green can be avoided by using the quinacridone pigment as the color material of the red pixel filters.

Figure 7:
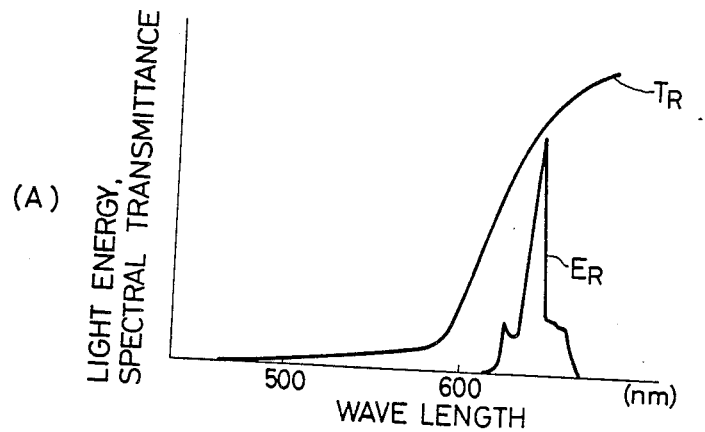
FIGS. 7 through 9 are graphs showing the relationship between the light-emitting spectrum of a fluorescent body and the light transmission spectrum of a color filter.
Figure 7:
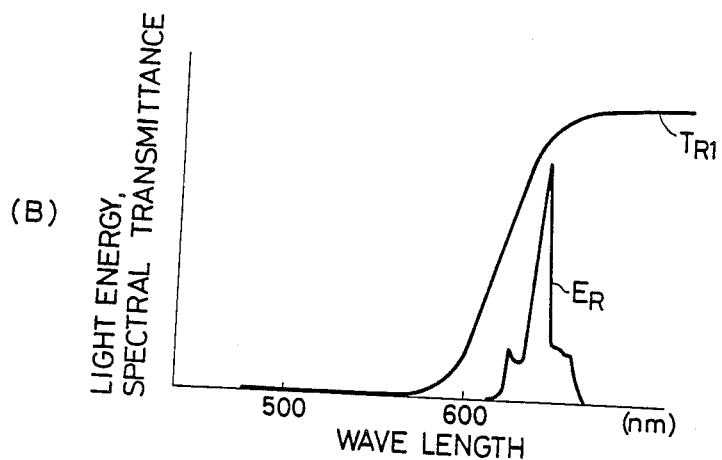

As an example, a quinacridone pigment expressed by the formula (I) in which $X_1$ and $X_2$ are hydrogen was dispersed in a resin binder and coated to a thickness of about 3 micrometers. The resultant filter exhibited a light transmission spectrum as indicated by $T_R$ in FIG. 7(A). The curve $E_R$ in FIG. 7(A) represents the light emission spectrum of a fluorescent material emitting red light.

The anthraquinone pigment also suitable for use as the red color material is expressed by the general formula:

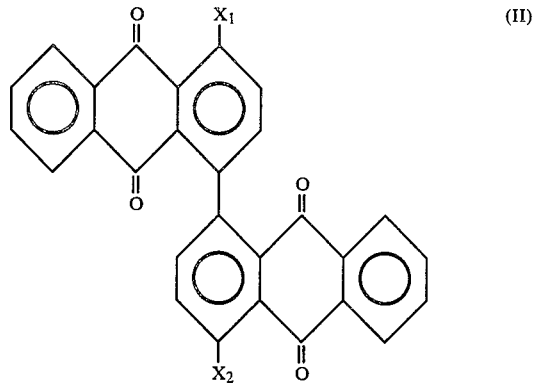

where $X_1$, $X_2$ indicate H or $NH_2$. The pigment expressed by this formula in which both $X_1$, $X_2$ are $NH_2$ is particular preferable for use as the color material of the red pixel filters.

As an example, an anthraquinone pigment expressed by the formula (II) in which $X_1$ and $X_2$ are $NH_2$ was dispersed in a resin binder and coated to a thickness of about 3 micrometers. The resultant filter exhibited a light transmission spectrum as indicated by $T_{R1}$ in FIG. 7(B). The curve $E_R$ in FIG. 7(B) represents the light emission spectrum of a fluorescent material emitting red light.

The phthalocyanine pigment suitable for use as the green color material is expressed by the general formula (III), (IV), or (V):

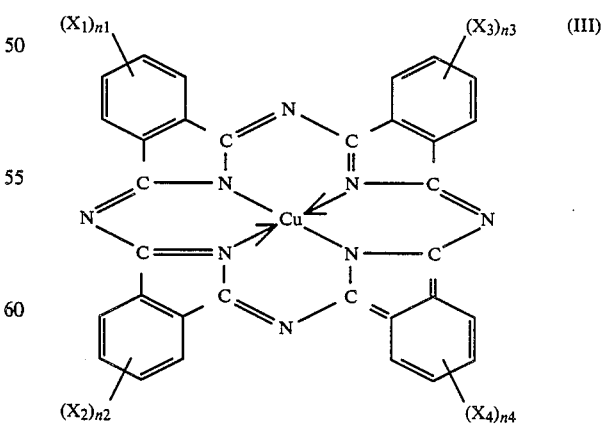

where $X_1, X_2, X_3, X_4$ indicate Cl or Br, and $n_1, n_2, n_3, n_4$ indicate 1 through 4.

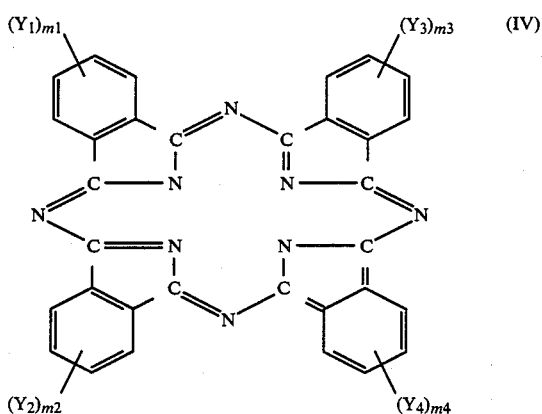

where $Y_1$, $Y_2$, $Y_3$, $Y_4$ indicate Cl or Br, and $m_1$, $m_2$, $m_3$, $m_4$ indicate 1 through 4.

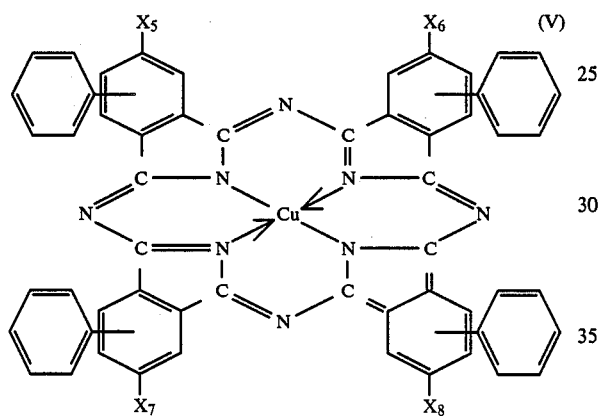

where $X_5$, $X_6$, $X_7$, $X_8$ indicate H or COONa.

A particularly preferable phthalocyanine pigment includes 8 through 16 chlorine atoms and bromine atoms per molecule in the general formula (III), and 8 through 16 chlorine atoms per molecule in the general formula (IV).

Figure 8:
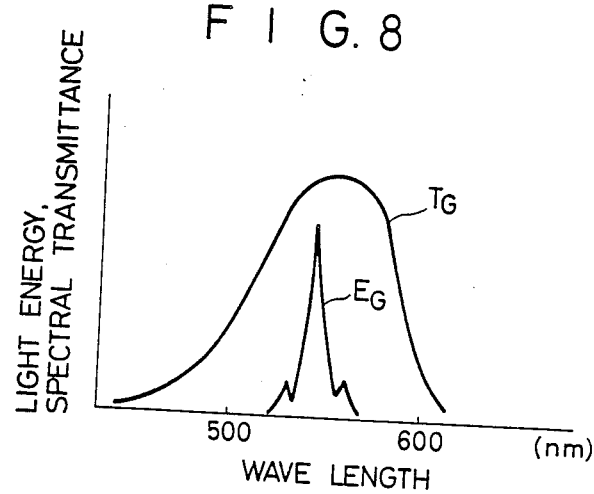

The phthalocyanine pigments expressed by the general formulas (III), (IV), and (V) have spectral characteristics suitable for use as the color materials of the green pixel filters in the liquid crystal color display device, and have wavelength regions at the half-amplitude level which do not extend into the wavelength regions of blue and red light, thus effectively preventing any color mixture. As an example, the phthalocyanine pigment which is expressed by the general formula (III) wherein $X_1$ through $X_4$ Cl and in which 15 through 16 chlorine atoms are contained in one molecule, was dispersed in a resin binder and coated up to a thickness of about 3 micrometers. The light transmission spectrum of the resultant filter is indicated by $T_G$ in FIG. 8. The curve $E_G$ indicates the light emission spectrum of a fluorescent material that emits green light.

The phthalocyanine pigment suitable for use as the blue color material is expressed by the general formula (VI):

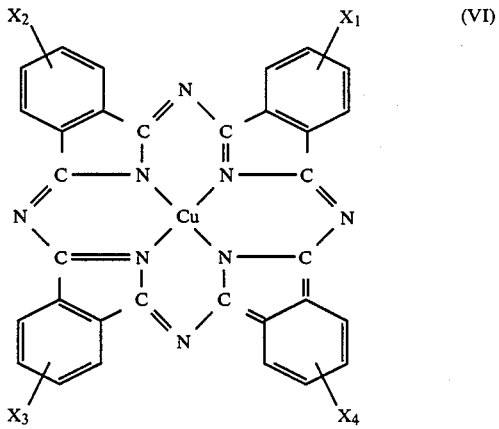

where $X_1$, $X_2$, $X_3$, $X_4$ indicate hydrogen or substituents. Especially preferable is a phthalocyanine pigment expressed by the general formula (VI) in which $X_1$ through $X_4$ are hydrogen, chroline, and

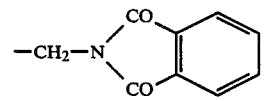

Figure 9:
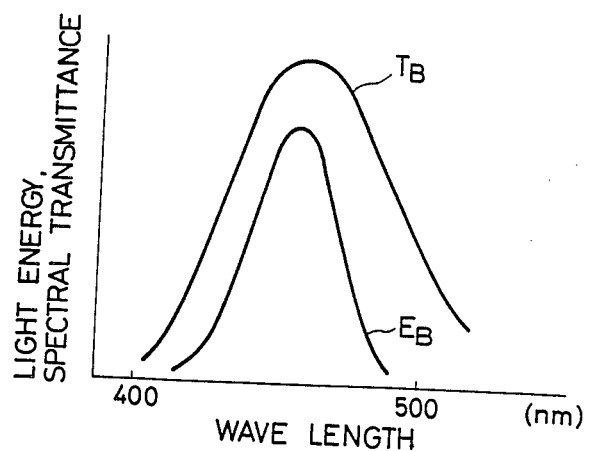

The phthalocyanine pigment expressed by the formula (VI) has spectral characteristics suitable for use as the color material of the blue pixel filters in the liquid crystal color display device, and effectively prevents any color mixture since the wavelength region at the half-amplitude level does not extend into the wavelength region of green light. As an example, the phthalocyanine pigment expressed by the general formula (VI) wherein X is hydrogen was dispersed in a resin binder and coated up to a thickness of about 3 micrometers. The light transmission spectrum of the resultant filter is indicated by $T_B$ in FIG. 9. The curve $E_B$ indicates the light emission spectrum of a fluorescent material that emits blue light.

The color filter can be fabricated by dispersing these pigments respectively in resin binders, and patterning the mixtures by the printing process such as screen printing or the photoetching process using a photoresist. The pigments should preferably be in the form of fine particles having an average diameter of 2 micrometers or smaller. The color filter is preferably of a thickness which generally ranges from 1 to 5 micrometers. Where the anthraquinone pigment is used, the thickness of the color filter should preferably be in the range of from 1 to 3 micrometers.

It is possible to provide a plurality of color materials in and control the color tone in each of the pixel filters.

For displaying color images with high fidelity dependent on image signals applied, the transparent pixel electrode elements in the liquid crystal cell should positionally be aligned with the pixel filters of the color filter. By forming the transparent electrode and the color filters on the opposite surfaces of one plate of the liquid crystal cell, any positional misalignment between the electrode and the color filter can be reduced as described above.

Where the transparent pixel electrode and the color filter are formed on the glass plate, however, there is a limitation on the effort to thin down the entire assembly. When a displayed image is observed at a large angle of view, i.e., when it is viewed not from directly above but obliquely, light from color pixel filters which do not correspond to the displayed image may tend to pass through the pixel electrode and be observed. When this happens, a phenomenon called a color shift occurs.

The first object of the invention, i.e., for improve color reproduceability, can be achieved by the previous embodiments described above.

The second object of the invention, i.e., for reduction of color shifts can be accomplished by making at least one of the plates in the liquid crystal cell in the form of a thin (preferably 120 micrometers or less, and more preferably in the range of from 80 to 100 micrometers) plastic film, and forming the color filter on the surface of this plastic film which is out of contact with the liquid crystal material. Color shifts are produced dependent on the thickness of the plate on which the color filter is formed. The problem of color shifts can substantially fully be solved by thinning down this plate. Reducing the thickness of the plate is also effective in color mixtures which are also produced dependent on the thickness of the plate.

The third object of the present invention can be achieved by using a thin plastic film as the plate 15 in each of the foregoing embodiments.

Figure 10:
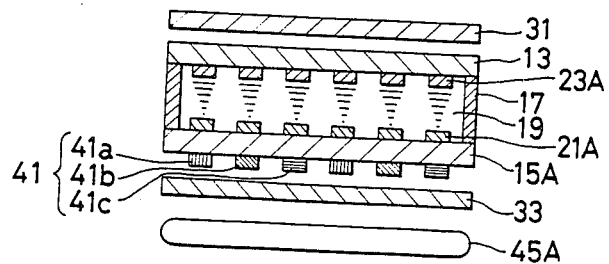
FIG. 10 is an exploded cross-sectional view of a liquid crystal color display device according to a further embodiment of the present invention.
Figure 11:
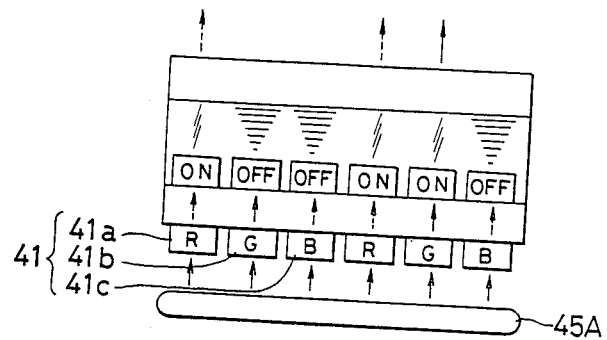
FIG. 11 is a schematic diagram illustrative of operation of the liquid crystal color display device shown in FIG. 10.

FIG. 10 shows a further embodiment in which the problem of color shifts is solved. Transparent pixel electrodes 21A, 23A comprise transparent pixel electrode elements. A plate 15A on which the transparent pixel electrode 21A is disposed is in the form of a plastic film having a thickness that is preferably 120 micrometers or less and more preferably in the range of from 80 to 100 micrometers. A light source 45A comprises a white-light lamp. FIG. 11 schematically shows the manner in which the liquid crystal color display device of FIG. 10 operates to display color images.

To accomplish the second object, it is not necessary to employ the fluorescent materials as a light-emitting body. Therefore, the white-light lamp 45A shown in FIG. 10 can be used, and other light-emitting bodies such as electroluminescent (EL) materials can also be used. Where an EL material is employed in a light source, the EL material should be sandwiched as a layer between electrodes across which a voltage will be applied. One of the electrodes should be a transparent electrode for light radiation.

The light source employing the fluorescent materials as the light-emitting body is particularly advantageous as a light source in a liquid crystal color display device since it is a planar light source for emitting scattering light and can produce a uniform amount of light.

Where a light source in which the fluorescent materials are used as the light-emitting body is employed, it is preferable that light emitted from the light source be white light or near-white light. If the light emitted from the light source were reddish or bluish, the displayed color image would also be reddish or bluish.

To make light emitted from the light source white or near-white, the light-emitting body should comprise a mixture of fluorescent materials capable of emitting red, green, and blue lights. These fluorescent materials should be mixtured in a balanced proportion to permit the red, green, and blue lights to be mixed into white light or near-white light. One example of such a fluorescent light-emitting body for emitting white light is as follows:

The fluorescent materials MgO MgF$_2$ GeO$_2$: Mn compound (red), Zn$_2$SiO$_4$: Mn (green), and (SrCaBa)$_5$(PO$_4$)$_3$Cl: Eu (blue) of equal weights were mixed, and nitrocellulose was mixed as a binder at a weight ratio of 1/4.5 with respect to the fluorescent materials. The mixture was then coated on a plate comprising a triacetate film. The coating was then dried to form a fluorescent layer having a thickness of about 6 micrometers. Upon exposure of the fluorescent plate to ultraviolet radiation, its entire surface emitted uniform white light and hence operated as a uniform planar light source without the need of a reflecting plate or a diffusing plate.

According to one process of achieving the first object of the invention, as described above, the fluorescent materials are used as the light source, and the wavelength region at the half-amplitude level of the fluorescent lights emitted from the fluorescent materials are contained in the wavelength regions at the half-amplitude level of the light transmission spectrums of the pixel filters of the corresponding colors.

While the fluorescent layer and the color filter are separate from each other in the previous embodiment for accomplishing such a process, the fluorescent layer and the color filter may be integral according to still another embodiment.

Figure 12:
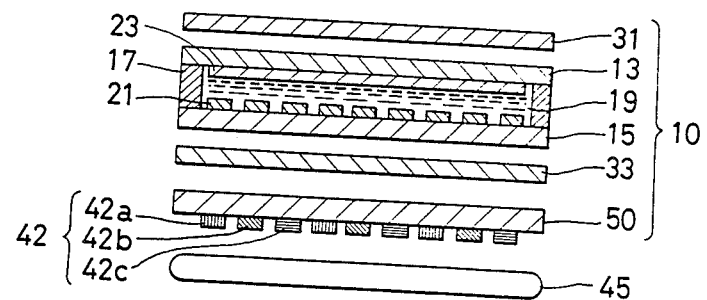
FIG. 12 is an exploded cross-sectional view of a liquid crystal color display device according to a still further embodiment of the present invention.

FIG. 12 shows such an alternative embodiment of the present invention. As shown in FIG. 12, a light-emitting layer 42 is disposed on a transparent support plate 50 and doubles as a light-emitting body and a color filter.

The light-emitting layer 42 comprises a dot-pixel or stripe-pixel pattern of red pixel elements 42a, green pixel elements 42b, and blue pixel elements 42c, which are aligned with the transparent pixel electrode elements in the liquid crystal cell, generally denoted at 10. The red pixel elements 42a include a fluorescent material capable of emitting red light and a colored light-transmissive material for transmitting red light, the green pixel elements 42b include a fluorescent material capable of emitting green light and a colored light-transmissive material for transmitting green light, and the blue pixel elements 42c include a fluorescent material capable of emitting blue light and a colored light-transmissive material for transmitting blue light. The colored light-transmissive materials may comprise the dyes and pigments described above as the color materials of the color filter.

Figure 6:
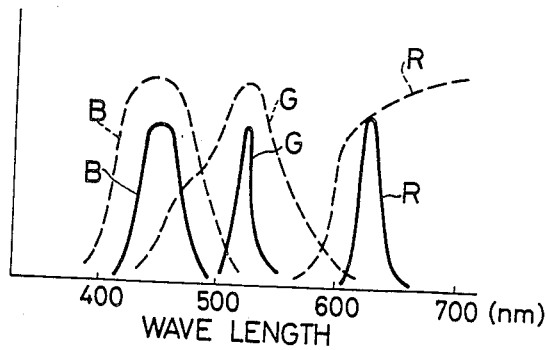
FIG. 6 is a graph explanatory of still another embodiment of the present invention.

The light emission spectrums of the red (R), green (G), and blue (B) fluorescent materials are as indicated by the solid lines in FIG. 6, for example, and the light transmission spectrums of the colored light-transmissive materials for R, G, B are as indicated by the dotted lines in FIG. 6, for example.

The ratio of mixture of the fluorescent materials and the colored light-transmissive materials is selected such that the fluorescent materials can effectively absorb radiation and emit light at a sufficient intensity. The ratio of light transmission of the colored light-transmissive materials (which comprise dyes or pigments) is selected to be at least 50%.

The ratio of mixture of the fluorescent materials in a quantity P and the colored light-transmissive materials in a quantity T is preferably in the range of: $10 > P/T > 1/10$ dependent on the materials used.

The light-emitting layer can be formed by dispersing the fluorescent materials and the dyes, for example, together with a resin binder into a suitable solvent to provide a homogeneous mixture, and patterning the mixture as mosaic-shaped or stripe-shaped pixel elements by the printing process or the photolithographic process.

Figure 13:
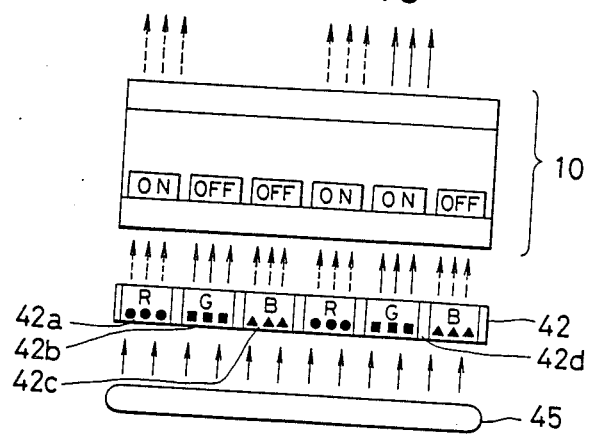
FIG. 13 is a schematic diagram illustrative of operation of the liquid crystal color display device shown in FIG. 12.

When ultraviolet radiation emitted from an ultraviolet lamp 45 falls on the light-emitting layer 42 as shown in FIG. 13, the fluorescent materials contained in the pixel elements 42a, 42b, 42c are stimulated to emit light. For example, the green pixel elements 42b emits green fluorescent light which is mixed by being filtered by the colored light-transmissive materials for green, and hence highly pure G light (→) falls on the liquid crystal cell 10. R and B lights are similarly produced. By using the liquid crystal cell 10 as a light shutter, fully-colored images can be displayed.

The spaces 42d between the pixel elements of the light-emitting layer 42 can be seen as black stripes by placing such a filter between the ultraviolet lamp 45 and the light-emitting layer 42 which can transmit ultraviolet radiation and cut off visible light. The liquid crystal material can be protected from deterioration which would otherwise be caused by ultraviolet radiation, by positioning such a filter between the light-emitting layer 42 and the liquid crystal cell 10 which can cut off ultraviolet radiation and transmit light having wavelengths of 400 nm and higher.

The light-emitting layer 42 may be disposed on the polarizer 33 or on the outer surface of the plate 15, rather than on the transparent support plate 50. It can easily be understood from the foregoing description that the third object of the invention can be achieved by disposing the light-emitting layer 42 on the outer surface of the plate 15 and constructing the plate 15 as a thin plastic film as described above.

The TN liquid crystal material has been illustrated in each of the above embodiments. However, it may be any liquid crystal material capable of functioning as a light switching element, such as a guest-host or dual-frequency driven liquid crystal material. The liquid crystal cell can be driven by any suitable processes such as the active matrix process.

In each of the above embodiments, the polarizers, the liquid crystal cell, and the support plate supporting the fluorescent layer or light-emitting layer can be of a unitary structure. Both of the plates in the liquid crystal cell may comprise plastic films to thin down the overall liquid crystal color display device.

Although certain preferred embodiments have been shown and described, it should be understood that many changes and modifications may be made therein without departing from the scope of the appended claims.

What is claimed as new and desired to be secured by Letters Patent of the United States is:

1. A liquid crystal color display device for displaying image information comprising:
    a liquid crystal unit including a liquid crystal cell for controlling the transmission and shutoff light according to said image information, said liquid crystal cell including a transparent pixel electrode having pixel electrode elements, a plurality of plates, and a liquid crystal material sealed between said plates;
    a light source having an emission spectrum separated into colors with red, green and blue peaks, each peak having a wavelength region at the half amplitude, said wavelength regions being non-overlapping;
    a color filter for passing therethrough light emitted by said light source in order to purify the color tone of said light, said color filter having pixel filters aligned with said pixel electrode elements said pixel filters having a transmission spectrum with red, green and blue peaks, each peak having a wavelength region at the half amplitude level which includes the wavelength region of the corresponding emission spectrum;
    at least one of said plates of said liquid crystal cell comprising a thin plastic film; and
    said color filter being disposed on the surface of said plastic film which is not in contact with said liquid crystal material.

2. A liquid crystal color display device according to claim 1, wherein said light source comprises an electroluminescent light-emitting body.

3. A liquid crystal color display device according to claim 1, wherein said light source comprises a white-light lamp.

4. A liquid crystal color display device according to claim 1, 2 or 3, wherein said pixel filters include pixel filters which transmit red light, pixel filters which transmit green light, and pixel filters which transmit blue light.

5. A liquid crystal color display device according to claim 1, wherein said thin plastic film is no greater than 120 micrometers thick.

6. The liquid crystal color display device according to claim 5, wherein said thin plastic film is 80–100 micrometers thick.

7. A liquid crystal color display device for displaying image information comprising:
    a liquid crystal unit including a liquid crystal cell for controlling the transmission and shutoff of light according to said image information, said liquid crystal cell including a transparent pixel electrode having pixel electrode elements, a pair of plates, and a liquid crystal material sealed between said plates;
    a light source having a fluorescent light-emitting body which emits fluorescent light upon exposure to electromagnetic radiation;
    a color filter for passing therethrough light emitted by said light source, said color filter having pixel filters of different colors aligned with said pixel electrode elements; and
    said pixel filters being made of color materials having wavelength regions at the half-amplitude level of the light transmission spectrums of said pixel filters which do not overlap each other.

8. A liquid crystal color display device according to claim 7, wherein said pixel filters includes pixel filters which transmit red light, pixel filters which transmit green light, and pixel filters which transmit blue light.

9. A liquid crystal color display device according to claim 7, wherein at least one of said plates comprises a thin plastic film, said color filter being disposed on the surface of said plastic film which is not in contact with said liquid crystal material.

10. A liquid crystal color display device according to claim 9, wherein said pixel filters include pixel filters which transmit red light, pixel filters which transmit green light, and pixel filters which transmit blue light, said light emitting body including fluorescent materials which emit red, green, and blue lights.

11. A liquid crystal color display device according to claim 10, wherein said fluorescent materials are arranged as a pixel pattern of pixel elements aligned with said pixel filters.

12. A liquid crystal color display device for displaying image information comprising:
   a liquid crystal unit including a liquid crystal cell for controlling the transmission and shutoff of light according to said image information, said liquid crystal cell including a transparent pixel electrode having pixel electrode elements, a pair of plates, and a liquid crystal material sealed between said plates;
   a light source having a fluorescent light-emitting body which emits fluorescent light upon exposure to electromagnetic radiating;
   a color filter for passing therethrough light emitted by said light source, said color filter having pixel filters of different colors aligned with said pixel electrode elements; and
   said fluorescent light-emitting body emitting light in colors corresponding to the colors of said pixel filters, said fluorescent light-emitting body being arranged such that the wavelength regions at the half-amplitude level of the light transmission spectrums of said fluorescent materials are contained in the wavelength regions at the half-amplitude level of the light transmission spectrums of said pixel filters.

13. A liquid crystal color display device according to claim 12, wherein said pixel filters include pixel filters which transmit red light, pixel filters which transmit green light, and pixel filters which transmit blue light, said fluorescent light-emitting body including fluorescent materials which emit red, green, and blue lights.

14. A liquid crystal color display device according to claim 12 or 13, wherein at least one of said plates comprises a thin plastic film, said color filter being disposed on the surface of said plastic film which is not in contact with said liquid crystal material.

15. A liquid crystal color display device according to claim 12, wherein said fluorescent light-emitting body is arranged as a pixel pattern of pixel elements aligned with said pixel filters.

16. A liquid crystal color display device according to claim 15, wherein at least one of said plates comprises a thin plastic film, said color filter being disposed on the surface of said plastic film which is not in contact with said liquid crystal material.

17. A liquid crystal color display device for displaying image information comprising:
   a liquid crystal unit including a liquid crystal cell for controlling the transmission and shutoff of light according to said image information, said liquid crystal cell including a transparent pixel electrode having pixel electrode elements;
   a light source disposed behind said liquid crystal unit and including a fluorescent light-emitting body which emits fluorescent light upon exposure to electromagnetic radiation; and
   said light-emitting body being arranged in a pixel pattern of pixel elements of fluorescent materials which emit red, green, and blue lights, said light-emitting body also including colored light-transmissive materials contained in said pixel elements and which selectively transmit the lights emitted from said fluorescent materials, said fluorescent materials having wavelength regions at the half-amplitude level of the light transmission spectrums of said fluorescent materials which are contained in the wavelength regions at the half-amplitude level of the light transmission spectrums of said colored light-transmissive materials.

* * * * *